(12) United States Patent
Bentele et al.

(10) Patent No.: US 8,859,454 B2
(45) Date of Patent: Oct. 14, 2014

(54) DIESEL OXIDATION CATALYST WITH GOOD LOW-TEMPERATURE ACTIVITY

(75) Inventors: Andreas Bentele, Bad Aibling (DE); Klaus Wanninger, Kolbermoor (DE); Gerd Maletz, Bad Aibling (DE); Martin Schneider, Pfinztal (DE)

(73) Assignee: Clariant Produkte (Deutschland) GmbH, Frankfurt/Main (DE)

( * ) Notice: Subject to any disclaimer, the term of this patent is extended or adjusted under 35 U.S.C. 154(b) by 342 days.

(21) Appl. No.: 13/146,459

(22) PCT Filed: Jan. 27, 2010

(86) PCT No.: PCT/EP2010/000487
§ 371 (c)(1),
(2), (4) Date: Sep. 6, 2011

(87) PCT Pub. No.: WO2010/086149
PCT Pub. Date: Aug. 5, 2010

(65) Prior Publication Data
US 2011/0311422 A1 Dec. 22, 2011

(30) Foreign Application Priority Data
Jan. 28, 2009 (DE) .......................... 10 2009 006 404

(51) Int. Cl.
*B01J 23/00* (2006.01)
*B01J 23/02* (2006.01)
(Continued)

(52) U.S. Cl.
CPC .............. *B01J 23/42* (2013.01); *B01J 37/0228* (2013.01); *B01D 53/945* (2013.01); *B01D 2255/1021* (2013.01); *B01D 2255/30* (2013.01); *B01D 2255/40* (2013.01); *B01J 37/08* (2013.01); *B01D 2255/20707* (2013.01); *B01D 2255/20715* (2013.01); *B01D 53/944* (2013.01); *B01J 37/0203* (2013.01); *Y02T 10/22* (2013.01); *B01J 23/63* (2013.01); *B01D 2255/2092* (2013.01); *B01J 37/0248* (2013.01); *B01D 2258/012* (2013.01); *Y10S 502/52719* (2013.01); *Y10S 502/52724* (2013.01)

USPC .............. 502/262; 502/74; 502/87; 502/263; 502/326; 502/332; 502/334; 502/339; 502/349; 502/350; 502/351; 502/355; 502/415; 502/439; 502/527.19; 502/527.24

(58) Field of Classification Search
USPC ............. 502/74, 87, 262, 263, 326, 332, 334, 502/339, 349–351, 355, 415, 439, 527.19, 502/527.24
See application file for complete search history.

(56) References Cited

U.S. PATENT DOCUMENTS 2,785,138 A * 3/1957 Milliken, Jr. .................... 502/35
3,296,119 A * 1/1967 Bicek ............................ 208/139
(Continued)

FOREIGN PATENT DOCUMENTS

DE 24 56 995 A1 6/1975
DE 28 56 030 A2 6/1980
(Continued)

OTHER PUBLICATIONS

Verdier, S., Rohart, E., Larcher, O., Harle, V. et al., "Innovative Materials for Diesel Oxidation Catalysts, with High Durability and Early Light-Off," SAE Technical Paper 2005-01-0476 (2005).

(Continued)

*Primary Examiner* — Cam N. Nguyen
(74) *Attorney, Agent, or Firm* — Florek & Endres PLLC

(57) ABSTRACT

The invention relates to a method for producing a catalyst, wherein the catalyst has a high activity and selectivity with regard to the oxidation of CO and NO. The invention also relates to the catalyst produced using the method according to the invention, the use of the catalyst as oxidation catalyst as well as a catalyst component which contains the catalyst according to the invention. Finally, the invention is directed towards an exhaust-gas cleaning system which comprises the catalyst component containing the catalyst according to the invention.

9 Claims, 3 Drawing Sheets

Figure 1:
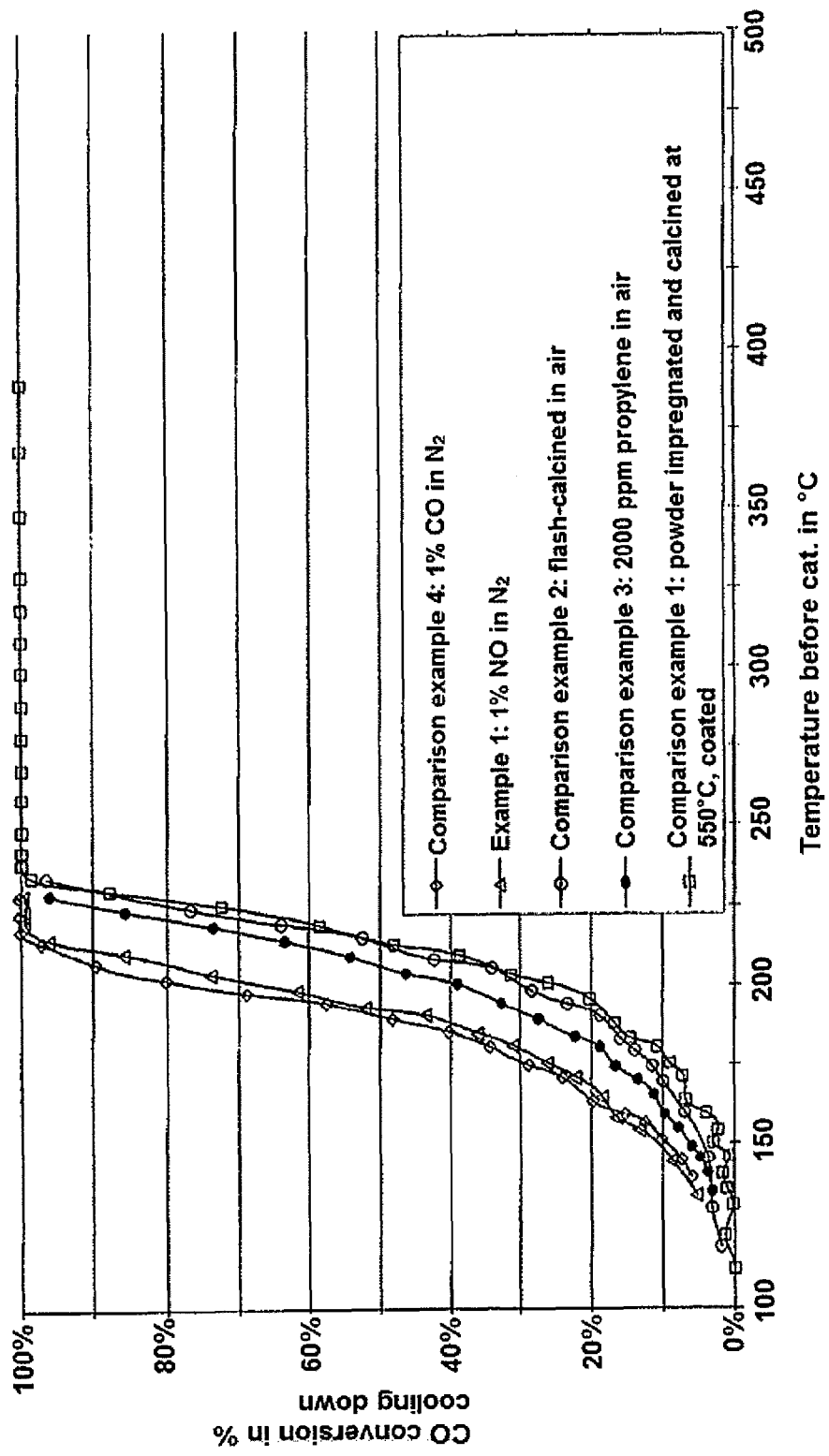

(51) Int. Cl.
*B01J 23/08* (2006.01)
*B01J 23/40* (2006.01)
*B01J 23/42* (2006.01)
*B01J 23/44* (2006.01)
*B01J 23/56* (2006.01)
*B01J 21/00* (2006.01)
*B01J 21/04* (2006.01)
*B01J 29/00* (2006.01)
*B01J 29/04* (2006.01)
*B01J 20/00* (2006.01)
*B01J 37/02* (2006.01)
*B01D 53/94* (2006.01)
*B01J 37/08* (2006.01)
*B01J 23/63* (2006.01)

(56) References Cited

U.S. PATENT DOCUMENTS

| | | | | |
|---|---|---|---|---|
| 3,850,847 A * | 11/1974 | Graham et al. | | 502/262 |
| 3,943,053 A | 3/1976 | Kovach et al. | | |
| 4,399,051 A * | 8/1983 | Rabinovich et al. | | 502/35 |
| 5,482,615 A * | 1/1996 | Meitzner et al. | | 208/139 |
| 6,406,614 B1 | 6/2002 | Tiedtke et al. | | |
| 6,777,370 B2 * | 8/2004 | Chen | | 502/241 |
| 7,022,646 B2 * | 4/2006 | Li | | 502/339 |
| 7,037,875 B2 * | 5/2006 | Hu et al. | | 502/304 |
| 7,410,626 B2 * | 8/2008 | Tran et al. | | 423/351 |
| 7,638,455 B2 * | 12/2009 | Birke et al. | | 502/182 |
| 7,981,390 B2 * | 7/2011 | Galligan et al. | | 423/213.5 |
| 2003/0140620 A1 | 7/2003 | Shigapov et al. | | |
| 2004/0082461 A1 | 4/2004 | Remans et al. | | |
| 2008/0124264 A1 | 5/2008 | Ikeda et al. | | |
| 2009/0180943 A1 * | 7/2009 | Caudle | | 423/213.5 |

FOREIGN PATENT DOCUMENTS

| | | |
|---|---|---|
| DE | 102006062331 A1 | 6/2008 |
| DE | 102007023979 A1 | 11/2008 |
| EP | 0 049 489 A1 | 4/1982 |
| EP | 0 800 856 B1 | 7/2003 |
| EP | 1 356 863 A1 | 10/2003 |
| EP | 1 129 764 B1 | 10/2005 |
| EP | 0 706 817 B1 | 2/2006 |
| JP | 2008-290000 A | 12/2008 |
| WO | 2007/071899 A1 | 12/2005 |

OTHER PUBLICATIONS

Goebel, Matthias, "International Search Report and Written Opinion of the International Search Authority, or the Declaration for International Application No. PCT/EP2010/000487," Jun. 15, 2010 (pp. 30-35).

Wittman-Regis, Agnes, "International Preliminary Report on Patentability," International Bureau of WIPO, Aug. 12, 2011.

Goebel, Matthias, "Written Opinion of the International Search Authority," International Bureau of WIPO, Jul. 28, 2011.

Schmitz, P.J., et al., "NO oxidation over supported Pt: Impact of precursor, support, loading, and processing conditions evaluated via high throughput experimentation," Applied Catalysis B: Environmental 67 No. 3-4, Oct. 5, 2006, p. 246-256.

Mulla, S.S., et al., "NO2 inhibits the catalytic reaction of NO and O2 over pt," Catalysis Letters vol. 100, Nos. 3-4, Apr. 1, 2005, p. 267-270.

Despres, J. et al, "Catalytic oxidation of nitrogen monoxide over pt/siO2," Applied Catalysis B: Environmental, vol. 50, No. 2, Feb. 26, 2004, p. 73-82.

Anonymous, "Stickoffoxide," RÖMPP Online, Mar. 2002, http://www.roempp.com/prod/roempp.php [retrieved Jun. 8, 2010].

* cited by examiner

DIESEL OXIDATION CATALYST WITH GOOD LOW-TEMPERATURE ACTIVITY

The invention relates to a method for producing a catalyst, wherein the catalyst has a high activity and selectivity with regard to the oxidation of CO and NO. The invention also relates to the catalyst produced using the method according to the invention, the use of the catalyst as oxidation catalyst as well as a catalyst component which contains the catalyst according to the invention. Finally, the invention is directed towards an exhaust-gas cleaning system which comprises the catalyst component containing the catalyst according to the invention.

In the early stages of exhaust-gas cleaning of combustion engines, only the exhaust gases from petrol engines were cleaned with three-way catalysts (TWC). The nitrogen oxides are reduced with the reductive hydrocarbons (HC) and carbon monoxide (CO). For this, the petrol engine is always driven under approximately stoichiometric conditions ($\lambda=1$). This cannot always be guaranteed precisely in this way, with the result that the conditions in the exhaust gas always fluctuate around $\lambda=1$. In other words, the catalyst is exposed alternately to an oxidative or a reductive gas atmosphere.

For about 15 years, attempts have also been made to after-treat the exhaust gases from diesel engines with catalysts. The exhaust gas from diesel engines contains carbon monoxide, unburnt hydrocarbons, nitrogen oxides and soot particles as air pollutants. The unburnt hydrocarbons comprise paraffins, olefins, aldehydes and aromatics. Unlike the petrol engine, the diesel engine always runs with an excess of oxygen. The result of this is that the catalyst is never exposed to reductive conditions. This has the following consequences:
1. The oxygen storage capacity of the catalyst material does not play the same role as with the TWC.
2. The noble metal particles are not always reduced again to metal of oxidation state 0.
3. The nitrogen oxides cannot be fully reduced when there is an excess of oxygen with the hydrocarbons (HC) present in the exhaust gas and CO.
4. The hydrocarbons and CO can be oxidized both with oxygen and with $NO_x$.

Diesel exhaust gases are much colder than exhaust gases from petrol engines and contain oxygen in a concentration between 3 and 10 vol.-%, which is why the catalytic activity of the catalyst on average is not always sufficient to oxidize HC and CO. In partial-load operation, the exhaust-gas temperature of a diesel engine lies in the range between 100 and 250° C. and only in full-load operation does it reach a maximum temperature between 550 and 650° C. In contrast, the exhaust-gas temperature of a petrol engine lies between 400 and 450° C. in partial-load operation and, in full load, can rise to up to 1000° C. It is therefore an aim to achieve as low as possible a CO light-off temperature.

In past years, diesel particle filters (DPF) have increasingly been introduced onto the market. These are normally fitted downstream of the DOCs. Soot is collected and oxidized in the DPF. The oxidation of soot is much more possible with $NO_2$ than with oxygen. Thus, the more $NO_2$ is contained in the gas stream after the DOC, the more soot continuously reacts. Thus, there has been a tendency in past years to oxidize as much NO to $NO_2$ as possible in the DOC. But $NO_2$ is an even more toxic gas than NO, with the result that this shift towards increased nitrogen oxide emissions manifests itself in a very negative way. An increasing $NO_2$ concentration due to DOC is also already detectable in cities. Thus, the trend is returning to a limiting of the oxidation of NO to $NO_2$.

Markedly reduced emissions of nitrogen oxides have thus also been prescribed for the Euro VI standard. It will be possible to achieve these either only by means of $NO_x$-trap catalysts or by means of a selective catalytic reduction by means of ammonia. The closer the $NO/NO_2$ ratio is to 1:1, the more efficiently such an SCR reaction runs, thus a substantial oxidation of NO to $NO_2$ is desirable for this. This should, however, be achieved with continuingly very good oxidation of CO and hydrocarbons HC.

SCR (selective catalytic reduction) denotes the selective catalytic reduction of nitrogen oxides from exhaust gases of combustion engines and also power stations. Only the nitrogen oxides NO and $NO_2$ (called $NO_x$ in general) are selectively reduced with an SCR catalyst, wherein $NH_3$ (ammonia) is usually admixed for the reaction. Only the harmless substances water and nitrogen thus form as reaction product. The transportation of ammonia in compressed-gas bottles is a safety risk for use in motor vehicles. Therefore precursor compounds of ammonia which are broken down in the exhaust-gas system of the vehicles accompanied by the formation of ammonia are customarily used. For example the use of AdBlue®, which is an approximately 32.5% eutectic solution of urea in water, is known in this connection. Other ammonia sources are for example ammonium carbamate, ammonium formate or urea pellets.

Ammonia must first be formed from urea before the actual SCR reaction. This occurs in two reaction steps which together are called hydrolysis reaction. Firstly, $NH_3$ and isocyanic acid are formed in a thermolysis reaction. In the actual hydrolysis reaction isocyanic acid is then reacted with water to ammonia and carbon dioxide.

To avoid solid depositions it is necessary for the second reaction to take place sufficiently quickly by choosing suitable catalysts and sufficiently high temperatures (from 250° C.). Simultaneously, modern SCR reactors act as the hydrolysis catalyst.

The ammonia formed through thermohydrolysis reacts at the SCR catalyst according to the following equations:

$$4NO+4NH_3+O_2 \rightarrow 4N_2+6H_2O \tag{1}$$

$$NO+NO_2+2NH_3 \rightarrow 2N_2+3H_2O \tag{2}$$

$$6NO_2+8NH_3 \rightarrow 7N_2+12H_2O \tag{3}$$

At low temperatures (<300° C.) the conversion proceeds predominantly via reaction (2). For a good low-temperature conversion it is therefore necessary to set an $NO_2$:NO ratio of approximately 1:1. Under these conditions the reaction (2) can already take place at temperatures from 170-200° C.

The oxidation of NO to $NO_x$ takes place according to the invention in an upstream oxidation catalyst which is necessary for an optimum degree of efficiency.

The basis of the catalytic exhaust-gas cleaning in a diesel engine is thus clearly the upstream oxidation catalyst which is to have an efficient oxidation action for CO, HC and NO. This is achieved for example by reducing the CO light-off temperature.

In the publication SAE 2005/01-0476 (Rhodia), it is clear that above all support materials with smaller interactions with Pt (II), e.g. aluminium oxide and zirconium oxide, make possible very low light-off temperatures for the oxidation of CO. Because of the larger BET surface area of aluminium, aluminium oxide is preferably used for DOC applications.

One way of reducing the light-off temperature for CO as much as possible can be found in the patent application EP 706817 from Umicore. EP 706817 describes a DOC catalyst with Pt on an Al/Si mixed oxide (in the best case 5% Si).

The further development using an H$^+$ and Na$^+$ zeolite is disclosed in EP 800856 B1, where light-off temperatures of approximately 150° C. for CO are already achieved.

A further improvement is described in EP 1129764 B1, where very finely distributed Pt particles with an average oxidation state of the Pt<2.5 form by a calcining through injection into a flame. It is to be borne in mind that combustion exhaust gases can contain a wide variety of components, such as CO, nitrogen oxides and residual hydrocarbons. In addition, combustion exhaust gases can also contain different quantities of oxygen depending on the guidance of the combustion. The gas mixture can thus be reductive or oxidative. In this case, it is not absolutely clear.

Although the injection of a platinum precursor into a flame results in a catalyst that has a good activity with regard to a CO oxidation, the oxidation activity with regard to the oxidation of NO to NO$_2$ cannot be controlled with this method. Thus, there is still a need for catalysts with as low as possible a light-off temperature for CO and, at the same time, a high activity and selectivity for the oxidation of NO to NO$_2$.

The object of the present invention was therefore to provide such catalysts.

The object is achieved by a method for producing a catalyst, comprising the steps:
(a) impregnating a support material with a platinum compound,
(b) drying the impregnated support material below the decomposition point of the platinum compound,
(c) calcining the impregnated support material in a gas stream which contains NO and inert gas.

N$_2$, He, Ne or Ar is preferably used as inert gas, particularly preferably N$_2$.

The gas stream preferably contains 0.5 to 3 vol.-% NO, particularly preferably 1 vol.-% NO, relative to the total volume of the gas stream. Accordingly, the gas stream preferably contains 97 to 99.5 vol.-% inert gas, in particular N$_2$, particularly preferably 99 vol.-% inert gas, relative to the total volume of the gas stream.

It was surprisingly found that heating a support material impregnated with a platinum compound in a gas stream that predominantly contains inert gas, in particular N$_2$, and too small proportions of NO results in a catalyst that displays a high activity for the oxidation of CO to CO$_2$, but at the same time also has a very high activity and selectivity with regard to the oxidation of NO to NO$_2$. This behaviour is very desirable in particular for a use as diesel oxidation catalyst (DOC) followed by SCR (selective catalytic reduction) or followed by DPF (diesel particle filter) and SCR.

Particularly preferably, the calcining (first calcining) of the impregnated support material takes place heating within 10 minutes, particularly preferably within 6 minutes and quite particularly preferably within 5 minutes. The calcining temperature is preferably 400° C. to 650° C., particularly preferably 450° C. to 600° C. A further (second) calcining then takes place, optionally after a short pause, over a period of 10-40 min, preferably 20 min, under the same conditions.

According to the invention, it is advantageous if the dried, impregnated support material is present as a thin layer or finely distributed, as this guarantees that the thermal energy can be optimally utilized during the calcining and thus a complete calcining can take place during the short time period of less than 10 minutes.

In a preferred embodiment of the invention, the dried, impregnated support material is therefore applied to a catalyst support body prior to the calcining. Particularly preferably, the dried, impregnated support material is applied to the catalyst support body in the form of a washcoat coating and then dried again below the decomposition temperature of the platinum compound.

The drying of the impregnated support material takes place according to the present invention preferably at temperatures of from 60° C. to 100° C., more preferably from 70 to 90° C., most preferably at 80° C. However, the temperature depends on the platinum compound used, as these can have different decomposition points and thus the temperature must be adapted accordingly. The drying preferably takes place under reduced pressure, particularly preferably under fine vacuum.

For the impregnating, the noble metal (Pt) is usually present as salt solution, for example as chloride, nitrate or sulphate. Normally, all customary salts and complex salts of platinum are suitable, e.g. hexachloroplatinic acid, tetrachloroplatinic acid, dinitro diamine platinate (II), tetraamine platinum (II) chloride, ammonium tetrachloroplatinate (II), ammonium hexachloroplatinate (IV), dichloro(ethylenediamine) platinum, tetraamine platinum (II) nitrate, tetraamine platinum (II) hydroxide, methylethanolamine platinum (II) hydroxide, platinum nitrate, ethanolammonium hexahydroxoplatinate (platinum ethanolamine, PtEA) and similar.

A metal oxide is preferably used as support material. The metal oxide is preferably selected from the group consisting of aluminium oxide, silicon oxide, aluminosilicate, zirconium oxide, titanium oxide, Al/Si mixed oxide or combinations thereof.

The necessary coating techniques for coating a catalyst support body are known to a person skilled in the art. Thus, e.g. the impregnated and dried metal oxide or mixed oxide is processed to an aqueous coating dispersion. This dispersion can be added as binder, e.g. silica sol. The viscosity of the dispersion can be set by the appropriate additives, with the result that it becomes possible to apply the necessary quantity of coating to the walls of the flow channels in a single work step. If this is not possible, the coating can be repeated several times, wherein each freshly applied coating is fixed by an intermediate drying. The finished coating is then calcined at the temperatures given above within the temperature range in less than 10 min, preferably less than 6 min, particularly preferably less than 5 min (first calcining). A second calcining step then takes place, optionally after a short pause, over a period of 10-40 min, preferably 20 min, under the same conditions.

For the exhaust-gas cleaning of diesel engines, coating quantities of from 50 to 500 g/l volume of the catalyst support body are advantageous. The catalyst component is preferably matched such that the catalytically active components are present in the metal oxide in a concentration of from approximately 0.01 to 7 g/l, preferably 2-4 g/l of the honeycomb body.

A metallic or ceramic monolith, a non-woven or metal foam can be used as catalyst support body. Other catalyst shaped bodies or catalyst support bodies known in the state of the art are also suitable according to the invention. A metallic or ceramic monolith that has a plurality of parallel passage openings which are provided with the washcoat coating is particularly preferred. With this, a uniform and in particular thin application of the washcoat suspension can be guaranteed, which thus supports the calcining.

Metallic honeycomb bodies are often formed from sheet metals or metal foils. The honeycomb bodies are produced for example by alternating arrangement of layers of structured sheets or foils. Preferably, these arrangements consist of one layer of a smooth sheet alternating with a corrugated sheet, wherein the corrugation can be formed for example sinusoidal, trapezoidal, omega-shaped or zigzag-shaped. Suitable metallic honeycomb bodies and methods for their production are described for example in EP 0 049 489 A1 or DE 28 56 030 A1.

In the field of catalyst support bodies, metallic honeycomb bodies have the advantage that they heat up more quickly and thus catalyst support bodies based on metallic substrates normally display a better response behaviour in cold-start conditions.

The honeycomb body preferably has a cell density of from 200 to 600 cpsi, in particular 400 cpsi.

The catalyst support body to which the catalyst according to the invention can be applied can be formed from any metal or a metal alloy and be produced e.g. by extrusion or by coiling or stacking or folding of metal foils. In the field of exhaust-gas cleaning, temperature-resistant alloys with the main constituents iron, chromium and aluminium are known. Monolithic catalyst support bodies that can be freely flowed through with or without internal leading edges for the agitation of the exhaust gas or metal foams which have a large internal surface area and to which the catalyst according to the invention adheres very well are preferred for the catalyst according to the invention. However, catalyst support bodies with slits, holes, perforations and impressions in the metal foil can also be used.

In the same way, catalyst support bodies made of ceramic material can be used. Preferably, the ceramic material is an inert material with a small surface area, such as cordierite, mullite or α-aluminium oxide. However, the catalyst support used can also consist of support material with a large surface area, such as γ-aluminium oxide.

A metal foam, for example a metallic open-pored foam material, can also be used as catalyst support body. Within the framework of the present invention, by the term "metallic open-pored foam material" is meant a foam material made of any metal or of any alloy which can optionally also contain additives and which has a plurality of pores which are connected to each other by conduit, with the result that for example a gas can be conducted through the foam material.

Metallic open-pored foam materials have a very low density because of the pores and cavities, but have a substantial stiffness and strength. The production of metal foams takes place for example by means of a metal powder and a metal hydride. Both powders are normally admixed together and then compacted to a shaped material by hot pressing or extrusion. The shaped material is then heated to a temperature above the melting point of the metals. The metal hydride releases hydrogen gas and the mixture foams.

However, there are also still other possibilities for producing metal foams, for example by blowing gas into a metal melt which has previously been made foamable by adding solid constituents. For aluminium alloys for example, 10 to 20 vol.-% silicon carbide or aluminium oxide is added for the stabilization. In addition, open-pored metallic foam structures with a pore diameter of from 10 ppi to approximately 50 ppi can be produced by special precision casting techniques.

A further subject of the invention is a catalyst which can be obtained using the method according to the invention. The catalyst is characterized by a very good activity and a selective oxidation potential for an oxidation of CO and NO. The catalyst also displays very good conversion rates for HC.

The catalyst can accordingly be used as oxidation catalyst. In particular, the oxidation catalyst is to be used for the selective oxidation of CO and NO. HC is also oxidized very well.

Preferably, the catalyst is present as coating on a catalyst support body, preferably a metallic or ceramic monolithic shaped body, a non-woven or a metal foam.

The scope of the invention also includes a catalyst component which contains the catalyst according to the invention. The catalyst component is accordingly equipped with a housing in which the catalyst is located. The housing has an inlet and outlet opening for the exhaust gas to be treated.

The catalyst component can be used as component in an exhaust-gas system. In a preferred embodiment of the invention, the catalyst component is fitted upstream of a diesel particle filter and/or an SCR catalyst. Through the high activity of the catalyst for the oxidation of NO to $NO_2$, for example a particle filter is supplied with enough $NO_2$ to oxidize soot particles, wherein $NO_2$ itself is reduced. $NO_2$ that is not required is preferably converted to harmless nitrogen in a downstream SCR catalyst using ammonia or an ammonia precursor.

A subject of the invention is thus also an exhaust-gas system comprising a catalyst according to the invention and in addition a diesel particle filter and/or an SCR catalyst.

Figure 2:
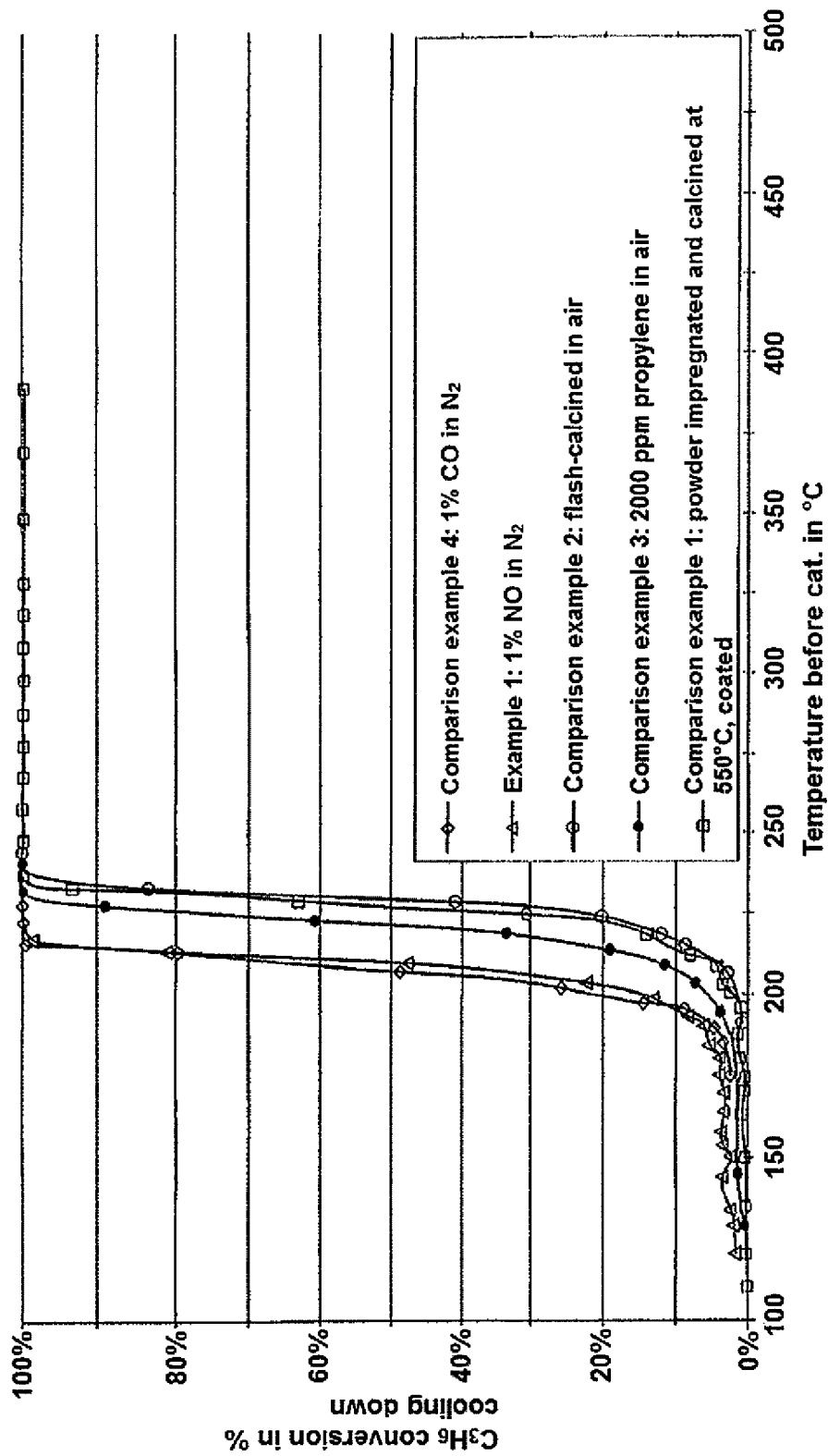
Figure 3:
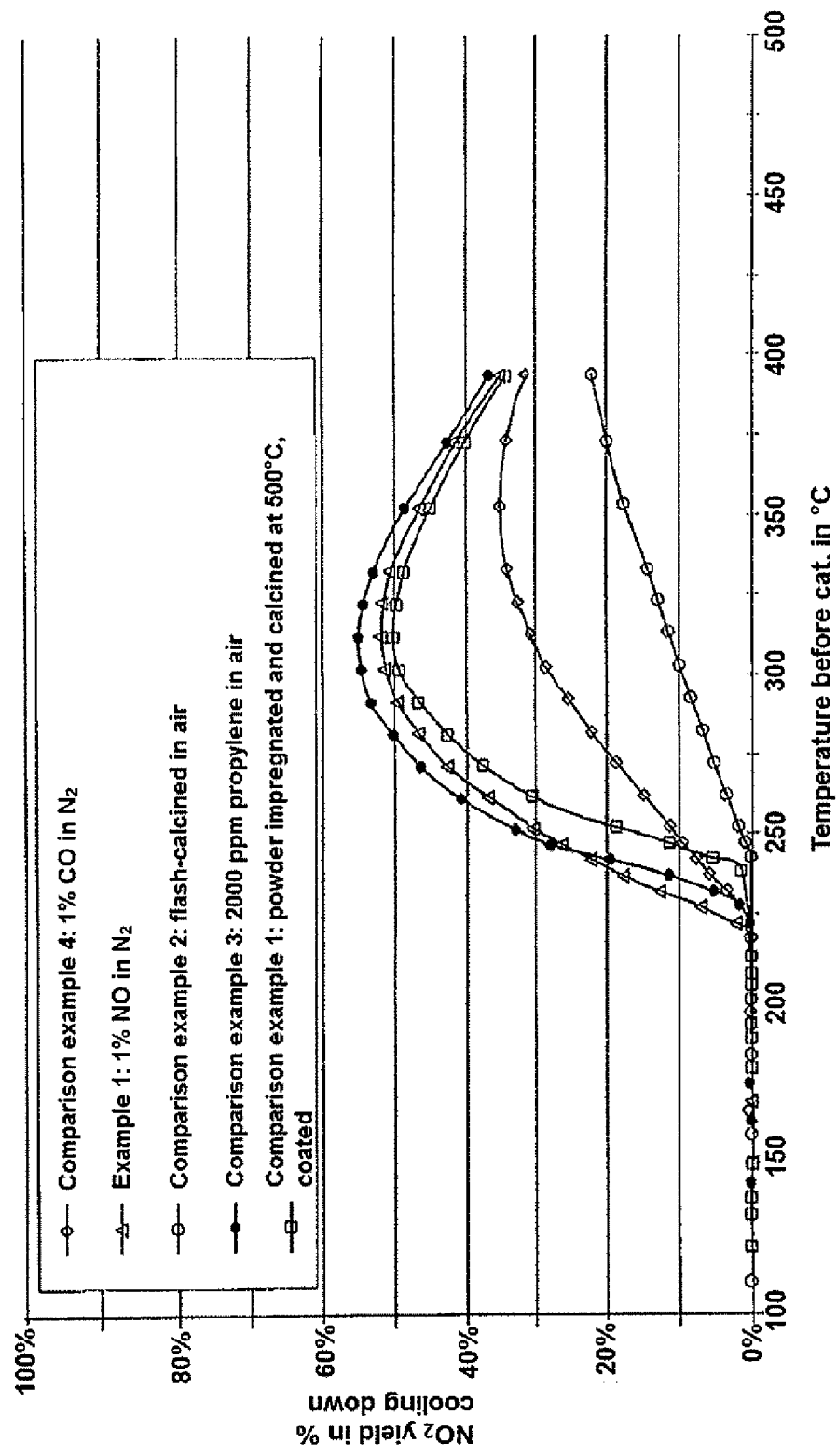

The invention will now be described in more detail with the help of some embodiment examples which are however to be considered as not limiting the scope of the invention. Reference is made in addition to FIGS. 1 to 3.

EMBODIMENT EXAMPLES

Example 1

1. Impregnation

The water absorption of an aluminium oxide (Puralox SCF a-140 L3 from Sasol) stabilized with lanthanum was first determined by weighing the powder, slurrying in water, filtering and then weighing again while wet. It was 50.18 wt.-%.

In a planetary mixer, 110.4 g of a 13.59% solution of platinum ethanolamine (ethanolammonium hexahydroxoplatinate) was added slowly dropwise to 300 g of the dry Puralox powder accompanied by stirring. The powder was dried for 2 days at 80° C. in the vacuum drying cupboard, with the result that 5 wt.-% platinum would be contained on a completely dry powder.

2. Washcoat Production, Coating 500 g of this vacuum-dried powder (from 2 impregnation batches) was topped up with 2500 g water, de-agglomerated with an Ultra-Turrax stirrer and then milled with a bead mill (4000 rpm, 1.2-mm $ZrO_2$ beads).

400-cpsi cordierite honeycombs were coated with this washcoat by immersion and blowing. The honeycombs were then in each case dried again at 80° C. in the vacuum drying cupboard.

As a drying at 80° C. under vacuum in this way does not necessarily take place completely, a loading of 60 g washcoat/l honeycomb was first produced by repeated coating. When the aluminium oxide is dry, this should correspond to a platinum loading of 3.0 g/l. A honeycomb from a series of identically coated and only vacuum-dried honeycombs was then calcined at 500° C. for 3 h and the platinum content analytically (pulping and ICP analysis) determined. This honeycomb (diameter 3 cm, length 8.8 cm) was coated with 3.68 g washcoat and weighed 33.4 g. With a Pt content of 5 wt.-%, the honeycomb should thus contain 0.55 wt.-% Pt when completely dry. 0.44 wt.-% platinum was determined from the analysis, because the 3.68 g weight of the washcoat was not completely dry and still contained water.

The weight of the honeycomb after vacuum drying and the weight of the honeycomb after calcining and the platinum concentration were used to calculate how much platinum must still be coated on the honeycomb for there to be 3.5 g/l platinum on a honeycomb. The platinum quantity which was already on the honeycomb and the washcoat loading after vacuum drying were able to be used to calculate what weight the not completely dry honeycomb vacuum-dried at 80° C. must have at the end in order to have 3.5 g Pt/l honeycomb volume. The honeycombs were then coated up to this weight, with the result that, at the end, each honeycomb had a platinum content of 3.5 g/l honeycomb volume.

3. Calcining of the Vacuum-Dried Honeycombs Under a Gas Mixture which Contained 1 Vol.-% No in Nitrogen The coated honeycombs were introduced into a quartz glass tube using a ceramic fibre blanket for the sealing. A gas mixture of vol.-% NO in nitrogen was conducted over the catalyst in the calcining unit. In front of the quartz glass tube there was a heater which very quickly heated the gas mixture to up to 490° C. immediately before the honeycomb. Around the quartz glass tube there was an IR oven which was also able to heat up the honeycombs quickly by means of IR radiation.

In this structure, the gas stream of 1 vol.-% CO in nitrogen was heated before the honeycomb from room temperature to 450° C. within 50 s and then further via a PID controller to 490° C. within a further minute. At the same time, a heating-up of the IR oven to 600° C. at 100° C./min was started. A measurement with a thermocouple in the honeycomb produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Comparison Example 1

1. Impregnation

The water absorption of an aluminium oxide (Puralox SCF a-140 L3 from Sasol) stabilized with lanthanum was first determined by weighing the powder, slurrying in water, filtering and then weighing again while wet. It was 50.18 wt.-%.

In a planetary mixer, 144.2 g of a 13.87% solution of platinum ethanolamine (ethanolammonium hexahydroxo-platinate) was added slowly dropwise to 400 g of the dry Puralox powder accompanied by stirring. The powder was then dried in the drying oven at 80° C. for 3 hours. The powder was then calcined in a calcining oven in air for 3 h at 500° C. (heat-up rate 2° C./min).

2. Washcoat Production, Coating 140 g of this already calcined powder was topped up to 700 g with water, de-agglomerated with an Ultra-Turrax stirrer and then milled with a bead mill (4000 rpm, 1.2-mm $ZrO_2$ beads).

400-cpsi cordierite honeycombs were coated with this washcoat by immersion and blowing. The honeycombs were then in each case dried again and calcined for 3 h at 500° C.

This coating was repeated until a loading of 70 g washcoat/l honeycomb was reached. As the powder had a platinum content of 5 wt.-%, this meant that the honeycomb also had a platinum content of 3.5 g/l.

Comparison Example 2

1. A honeycomb impregnated with platinum ethanolamine and vacuum-dried was produced as described in Example 1.

2. Calcining of the vacuum-dried honeycombs under air.

The coated honeycombs were introduced into a quartz glass tube using a ceramic fibre blanket for the sealing.

In the calcining unit, air was conducted over the catalyst.

In front of the quartz glass tube there was a heater which very quickly heated the air to up to 490° C. immediately before the honeycomb. Around the quartz glass tube there was an IR oven which also heated up the honeycombs quickly by means of IR radiation.

In this structure, the air stream was heated before the honeycomb from room temperature to 450° C. within 50 s and then further via a PID controller to an inlet temperature of 490° C. within a further minute. At the same time, a heating-up of the IR oven to 600° C. at 100° C./min was started. The measurement with a thermocouple in the honeycomb thus produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Comparison Example 3

1. A honeycomb impregnated with platinum ethanolamine and vacuum-dried is produced as described in Example 1.
2. Calcining with 2000 ppm propylene in air:

The coated honeycombs were introduced into a quartz glass tube using a ceramic fibre blanket for the sealing. The calcining of the vacuum-dried honeycombs took place in a calcining unit with a gas mixture of 2000 ppm propylene in air by conducting the gas stream over the catalyst.

In front of the quartz glass tube there was a heater which very quickly heated the gas mixture to up to 490° C. immediately before the honeycomb. Around the quartz glass tube there was an IR oven which also heated up the honeycombs quickly by means of IR radiation.

In this structure, the gas stream was heated up before the honeycomb from room temperature to 450° C. within 50 s and then further via a PID controller to an inlet temperature of 490° C. within a further minute. At the same time, a heating-up of the IR oven to 600° C. at 100° C./min was started. The measurement with a thermocouple in the honeycomb produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Comparison Example 4

1. A honeycomb impregnated with platinum ethanolamine and vacuum-dried is produced as described in Example 1.
2. Calcining of the vacuum-dried honeycombs under a gas mixture of 1 vol.-% CO in nitrogen.

The coated honeycombs were introduced into a quartz glass tube using a ceramic fibre blanket for the sealing. A gas mixture of 1 vol.-% CO in nitrogen was conducted over the catalyst in the calcining unit. In front of the quartz glass tube there was a heater which very quickly heated the gas mixture to up to 490° C. immediately before the honeycomb. Around the quartz glass tube there was an IR oven which also heated up the honeycombs quickly by means of IR radiation. In this structure, the gas stream was heated up before the honeycomb from room temperature to 450° C. within 50 s and then further via a PID controller to an inlet temperature of 490° C. within a further minute. At the same time, a heating-up of the IR oven to 600° C. at 100° C./min was started. The measurement with a thermocouple in the honeycomb thus produced at the end a temperature of 550° C. in the honeycomb. This temperature was reached after 6 min. Under these conditions, after these 6 min, calcining was continued for another 20 min at a gas inlet temperature of 490° C. and an IR oven temperature of 600° C.

Example 5

Comparison Test of the Catalysts

The catalyst honeycombs produced in Example 1 and the comparison examples were tested for the oxidation of CO, propylene and NO in a reactor under the following conditions.
Space Velocity: 70 000 $h^{-1}$

| CO: | 500 | ppm |
|---|---|---|
| NO: | 500 | ppm |
| Propylene: | 500 | ppm |
| Oxygen: | 5% | |
| Water: | 10% | |
| $CO_2$: | 70-90 | ppm |
| Nitrogen: | Remainder | |

The gas stream was heated up before the catalyst. For the test, the catalyst was first operated for 30 min under these gas conditions at 390° C. and then cooled down in steps of 10° C. Each temperature was maintained for 8 min and the product gas composition determined between 7 and 8 min. Below 250° C., the cooling down took place in 5° C. steps in order to be able to more precisely determine in particular the CO light-off temperature (50% CO conversion).

FIG. 1: shows the CO conversion of the catalysts used:

It is clear that the catalyst calcined with NO in $N_2$ has the best CO light-off temperature with at the same time a very high NO oxidation (see FIG. 3). The catalyst which was calcined with 1 vol.-% CO in nitrogen displays a very good light-off temperature for CO, but also a lower oxidation activity for the oxidation of NO to $NO_2$, as can be seen from FIG. 3.

FIG. 2 shows the propylene conversion (a hydrocarbon, HC) of the catalysts used. Here too, the catalyst calcined with NO in nitrogen is very good.

The yield for the oxidation of NO to $NO_2$ is represented in FIG. 3. It is clear that not only is the catalyst which was calcined with CO in nitrogen better for an oxidation reaction, but the catalyst surprisingly oxidizes much less NO to $NO_2$ under the same conditions in the same test. However, this is not the case with a calcining with 1 vol.-% NO in nitrogen. Although the catalyst which was calcined with propylene in air delivers the best NO oxidation, it displays a clearly poorer CO light-off temperature. The catalyst according to the invention which was calcined with NO in nitrogen displays the best combination of very good CO light-off temperature and a very high activity for the oxidation of NO to $NO_2$.

In all ranges, the catalyst calcined with propylene in air is at least better than the catalysts calcined only in air.

The invention claimed is:

1. A method for producing a catalyst, comprising the steps of:
   a) impregnating a metal oxide support material with a platinum compound,
   b) drying the impregnated metal oxide support material at a temperature in the range from 60° C. to 100° C. which is below the decomposition point of the platinum compound to obtain a dried impregnated metal oxide support,
   c) calcining the dried impregnated metal oxide support material obtained in step b) in a gas stream which consists of NO and inert gas, wherein the calcining takes place at a temperature of from 400 to 650° C.

2. The method according to claim 1, wherein in step c) a first calcining of the dried impregnated metal oxide support material takes place by heating up the dried impregnated support material obtained in step b) to the calcining temperature within 10 min and further calcining the dried and first calcined impregnated metal oxide support material for an additional 10 to 40 min under the same conditions as specified for the first calcining of the dried impregnated metal oxide support material.

3. The method according to claim 1, wherein the gas stream contains 0.5 to 3 vol.-% NO and 97 to 99.5 vol.-% inert gas.

4. The method according to claim 1, wherein $N_2$, He, Ne or Ar, preferably $N_2$, is used as inert gas.

5. The method according to claim 1, wherein the calcining takes place at a temperature of from 400 to 600° C.

6. The method according to claim 1, wherein the dried, impregnated metal oxide support material is applied to a catalyst support body before the calcining.

7. The method according to claim 6, wherein the dried, impregnated support material is applied to the catalyst support body in the form of a washcoat coating and then dried below the decomposition temperature of the platinum compound.

8. The method according to claim 6, wherein a metallic or ceramic monolith, a non-woven or a metal foam is used as catalyst support body.

9. The method according to claim 1, wherein the metal oxide is selected from the group consisting of aluminum oxide, silicon oxide, aluminosilicate, zirconium oxide, titanium oxide, Al/Si mixed oxide or combinations thereof.

* * * * *